(12) United States Patent
Öhrle et al.

(10) Patent No.: US 6,877,419 B2
(45) Date of Patent: Apr. 12, 2005

(54) COMPOSITE DIAPHRAGM FOR DIAPHRAGM PUMPS

(75) Inventors: Joachim Öhrle, Herrenberg (DE); Leon Radom, Ellhofen (DE)

(73) Assignee: ULMAN Dichtungstechnik GmbH, Sindelfingen (DE)

(*) Notice: Subject to any disclaimer, the term of this patent is extended or adjusted under 35 U.S.C. 154(b) by 22 days.

(21) Appl. No.: 10/430,075

(22) Filed: May 6, 2003

(65) Prior Publication Data

US 2003/0230191 A1 Dec. 18, 2003

(30) Foreign Application Priority Data

Jun. 18, 2002 (DE) .......................................... 102 27 193

(51) Int. Cl.[7] .................................................. F16J 3/00
(52) U.S. Cl. ..................... 92/103 R; 92/98 R; 92/103 F
(58) Field of Search ................................ 92/103 R, 96, 92/98 R, 103 F (56) References Cited

U.S. PATENT DOCUMENTS

| | | | | |
|---|---|---|---|---|
| 3,435,734 A | * | 4/1969 | Bushway et al. | ......... 92/103 R |
| 3,911,796 A | * | 10/1975 | Hull et al. | ................ 92/103 R |
| 3,947,156 A | * | 3/1976 | Becker | ..................... 92/103 R |
| 4,270,441 A | * | 6/1981 | Tuck, Jr. | ..................... 92/98 R |
| 5,349,896 A | * | 9/1994 | Delaney et al. | ........... 92/103 F |
| 5,699,717 A | * | 12/1997 | Riedlinger | .................. 92/98 R |

* cited by examiner

Primary Examiner—F. Daniel Lopez
Assistant Examiner—Michael Leslie
(74) Attorney, Agent, or Firm—Collard & Roe, P.C.

(57) ABSTRACT

A composite diaphragm for diaphragm pumps comprises an elastomer body and a polytetrafluoroethylene (PFTE) coating on its back side. The elastomer body has a shape of a circular dish that has an edge region with a clamping area, a bottom and a flexible section of the diaphragm that connects the edge of the dish with the bottom. The flexible section of the diaphragm comprises a multitude of naps forming elevations on the coated side of the elastomer body. The PFTE coating is a plane ring surface with the area of the flexible section of the diaphragm.

14 Claims, 9 Drawing Sheets

COMPOSITE DIAPHRAGM FOR DIAPHRAGM PUMPS

BACKGROUND OF THE INVENTION

1. Field of the Invention

The invention relates to a composite diaphragm for diaphragm pumps comprises of an elastomer body and a polytetrafluoroethylene (PTFE) coating on the product side. This elastomer body has the shape of a circular dish that comprises an edge of the dish with a clamping area; a bottom; and a flexible section of the diaphragm connecting the edge of the dish with the bottom.

The composite diaphragm is clamped in a diaphragm pump along the side of the edge, whereas the bottom performs lifting movements. The flexible section of the diaphragm is turned inside out with each lifting movement, whereby roll-off movements of the flexible material are observed in a radial section. Technically speaking, the flexible section of the diaphragm can therefore be referred to as a rolling loop in a tech.

2. The Prior Art

When composite diaphragms are used, where the flexible section of the diaphragm is a smooth ring surface and where the PTFE coating contains radial white staining in the form of lines, this indicates the onset of damage to the material. As this damage to the PTFE material progresses, the composite diaphragm loses its chemical resistance to aggressive conveyed media. The development of this damage as described above limits the useful life of the diaphragm.

U.S. Pat. No. 5,349,896 shows a composite diaphragm that has the structure specified above, wherein the flexible section of the diaphragm is stiffened by radial ribs. Such ribs extend from a transition area adjoining the bottom, up to the edge of the dish of the elastomer body. Thus, these ribs make it possible to prevent the damage described above from developing; however, the roll-off property of the flexible section of the diaphragm deteriorates and the resistance to roll-off increases to a considerable extent.

SUMMARY OF THE INVENTION

It is an object of the invention to provide a composite diaphragm for diaphragm pumps that permits a long useful life without damage to the PTFE coating. This design contains good roll-off properties during the operation of the pump.

This object is achieved by a composite diaphragm in which the flexible section of the diaphragm has a multitude of naps, cups or protrusions forming elevations in the PTFE coating. These naps are preferably in the form of cups with a circular or elliptic base area. These naps, as defined by the invention provide the flexible section of the diaphragm with punctual stiffening elements. In addition, the areas disposed between the naps are flexible, so that the flexible section of the diaphragm can be turned inside out with low pressure. Thus there are no folds caused by compression or lines caused by buckling. When in use, the composite diaphragm performs defined rolling movements, whereby the resistance to roll-off of the rolling fold is low. Furthermore, the napped structure of the composite diaphragm as defined by the invention creates superior adhesion between the elastomer body and the PTFE coating. The superior adhesion of the layered composite is attributed to a cogging effect of the naps or a larger surface area obtained as a result of the nap-like embossing.

These naps are preferably arranged lined up in at least two concentric circles with an angular division of between 5° and 30°. The naps, burls or protrusions are arranged in concentric circles and can be lined up in the radial direction in lines extending through the center of the circles. However, the invention also covers an embodiment in which the naps are arranged in adjacent concentric circles at offset angles in relation to each other so that in the radial direction, one nap is disposed in front of each gap between two naps when these naps are lined up in the peripheral direction. Furthermore, these naps are arranged in the circle wherein all have the largest diameter and/or the smallest diameter and form a chain without gaps in the peripheral direction.

BRIEF DESCRIPTION OF THE DRAWINGS

Other objects and features of the present invention will become apparent from the following detailed description considered in connection with the accompanying drawings which disclose at least one embodiment of the present invention. It should be understood, however, that the drawings are designed for the purpose of illustration only and not as a definition of the limits of the invention.

In the drawings, wherein similar reference characters denote similar elements throughout the several views.

DETAILED DESCRIPTION OF THE PREFERRED EMBODIMENT

Figure 1:
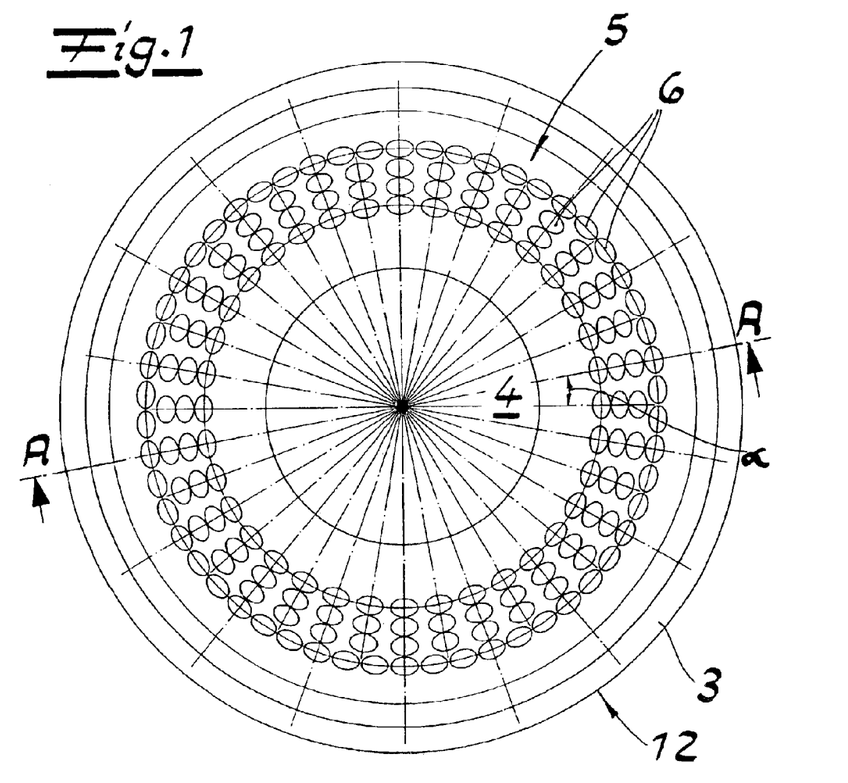
FIG. 1 is a top view of the product side of an embodiment of a composite diaphragm for diaphragm pumps according to the invention.

Referring in detail to FIG. 1, the drawings show a composite diaphragm for diaphragm pumps. The composite diaphragm comprises an elastomer body 1 and a coating 2 of polytetrafluoroethylene (PTFE) on the product side. The elastomer body has the shape of a circular dish with an edge 3 of the dish with a clamping area; a bottom 4; and a flexible section 5 of the diaphragm connecting the edge of the dish with the bottom. A comparative look at the figures shows that the flexible section 5 of the diaphragm comprises a multitude of reinforcing elements which can be in the form of naps or protrusions 6 forming elevations in PTFE coating 2. Naps 6 are formed as cups with a preferably circular base area and are arranged in the exemplified embodiments in concentric circles with an angular distribution α of between 5° and 30°.

As in FIG. 1, the naps are arranged so that they are lined up closely spaced in the radial direction in lines extending through the center of the circle. Furthermore, FIG. 1 shows that naps 6 arranged in the circle with the largest diameter form a chain without gaps along a periphery of this diameter. Other arrangements of the naps 6 as defined by the invention are shown in FIGS. 3a to 3h.

Figure 2:
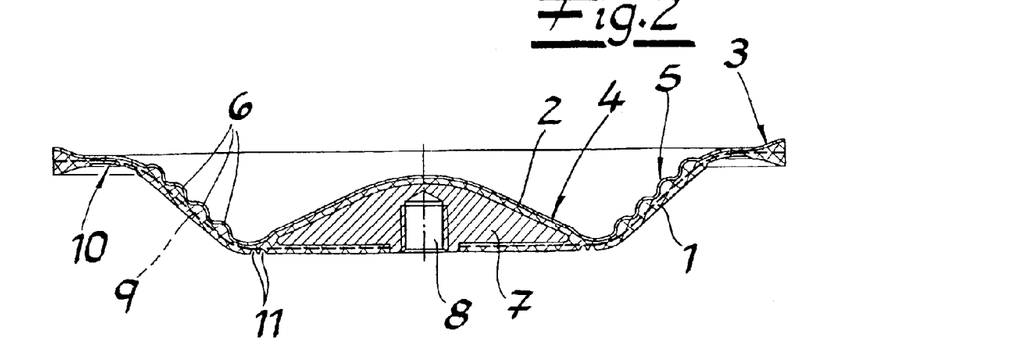
FIG. 2 is a section through the object of FIG. 1 in the sectional plane A—A.
Figure 3A:
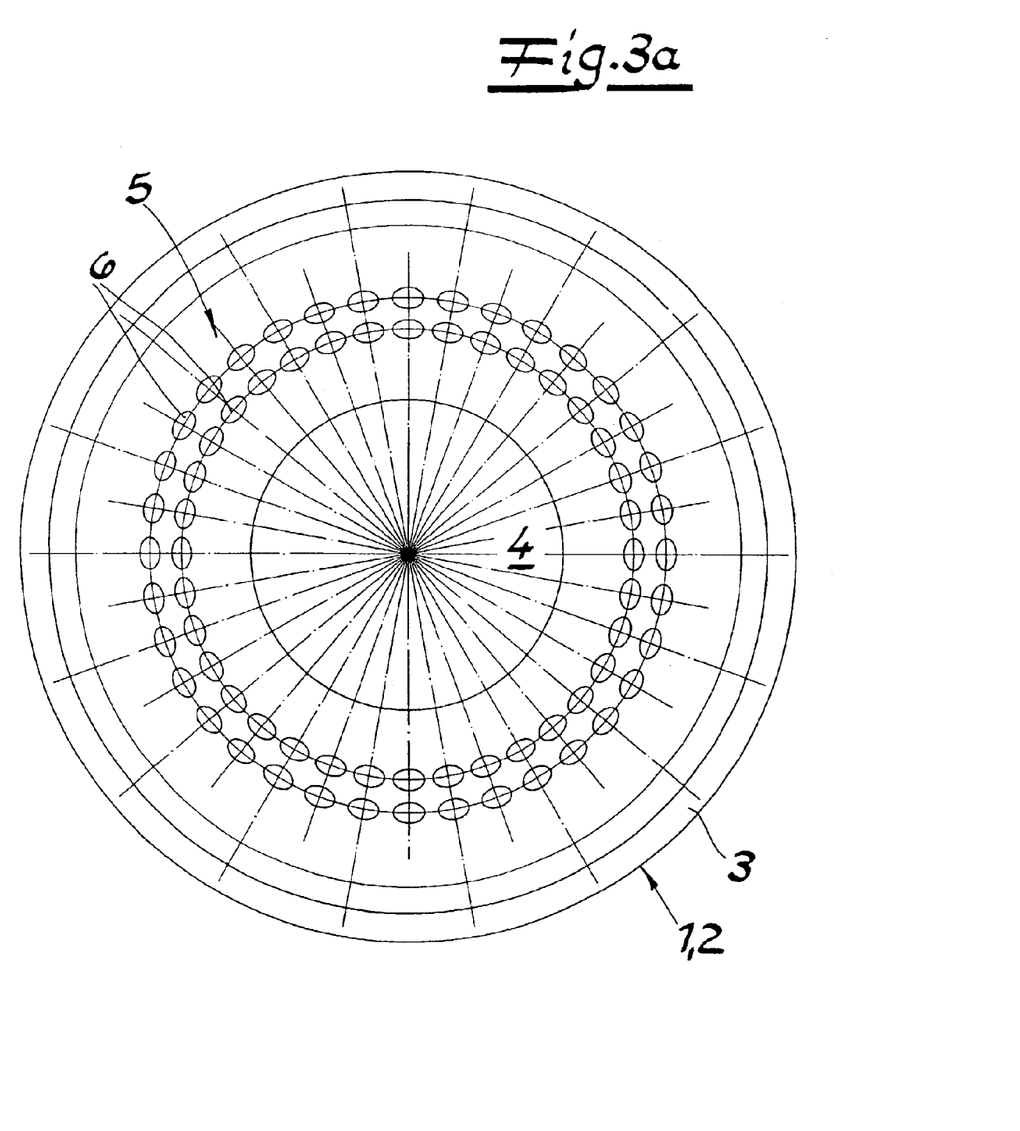
FIGS. 3a to 3h each show other exemplified embodiments by a top view of the product side.
Figure 3B:
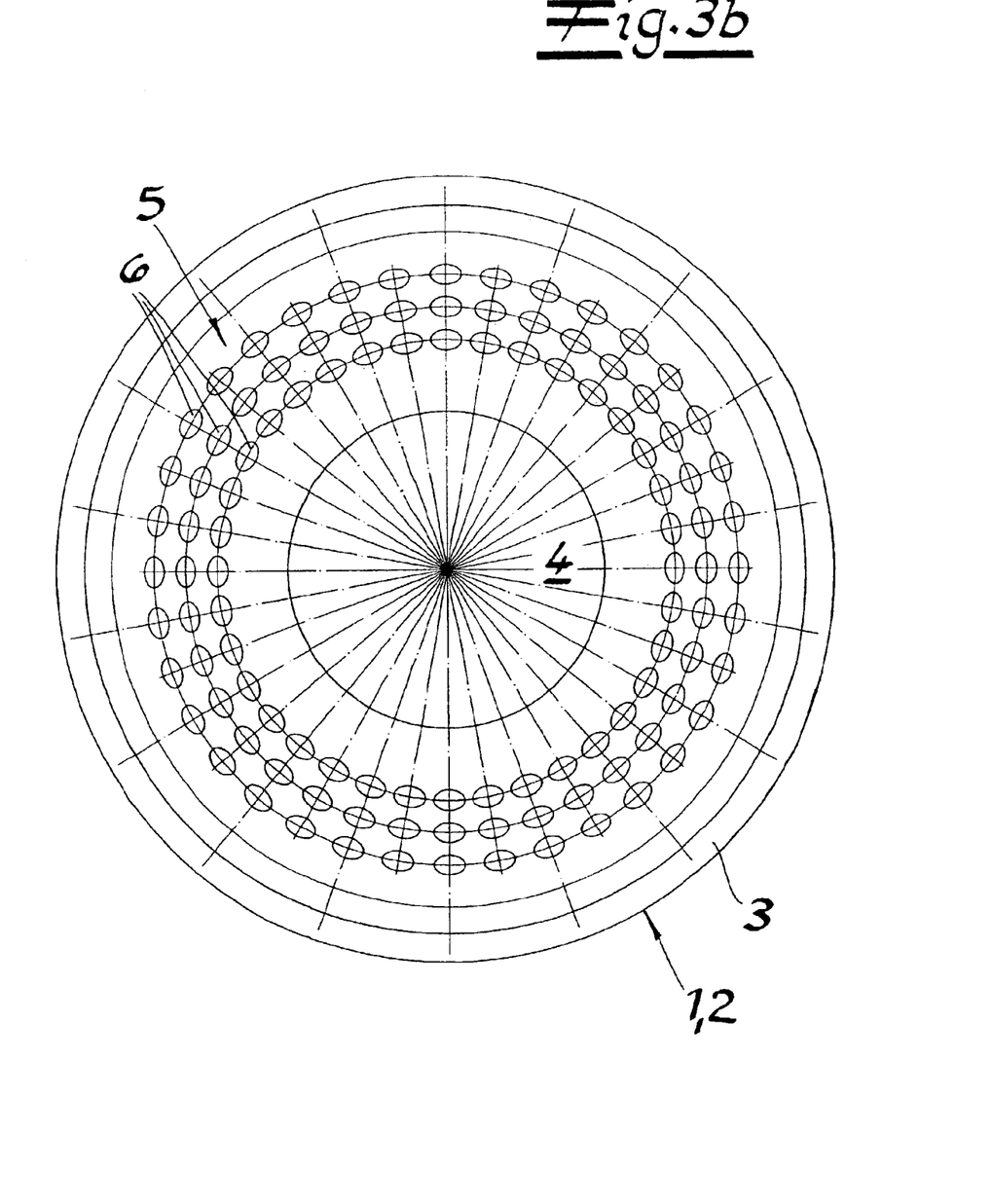
Figure 3C:
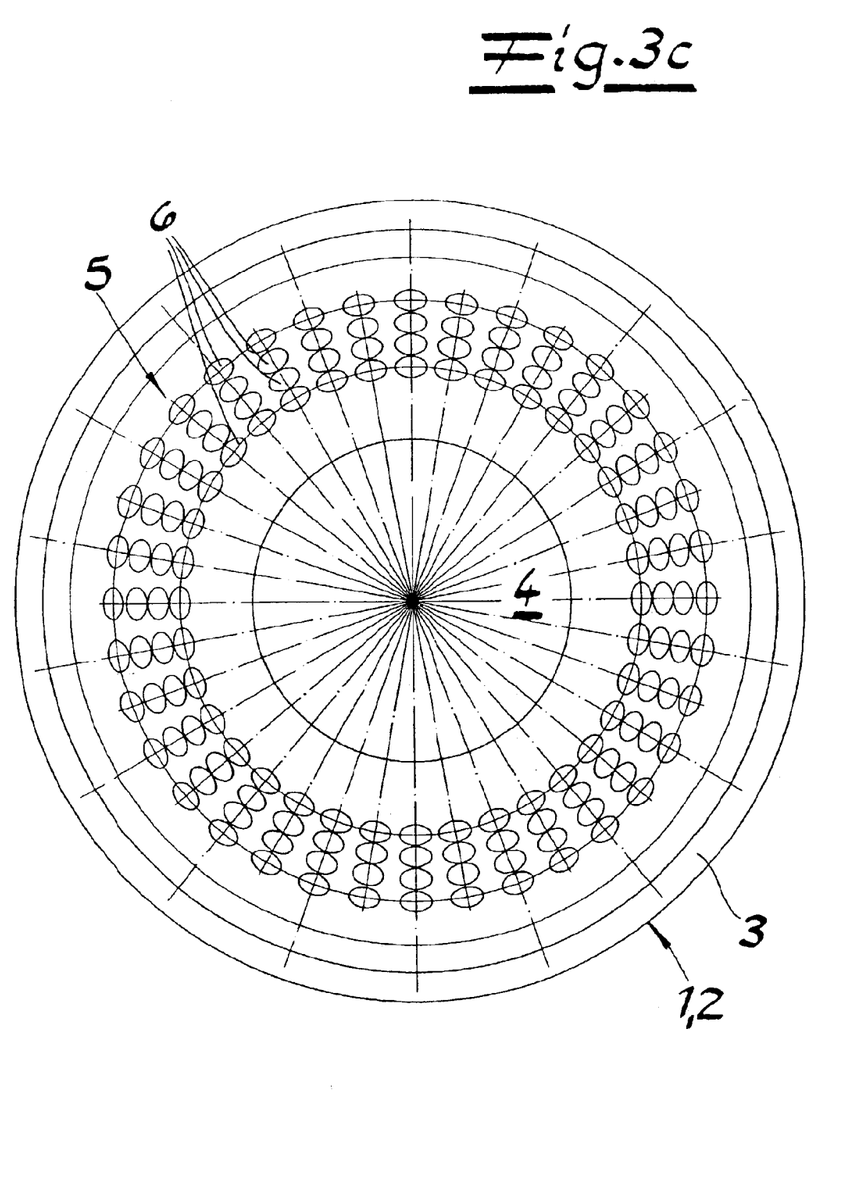
Figure 3D:
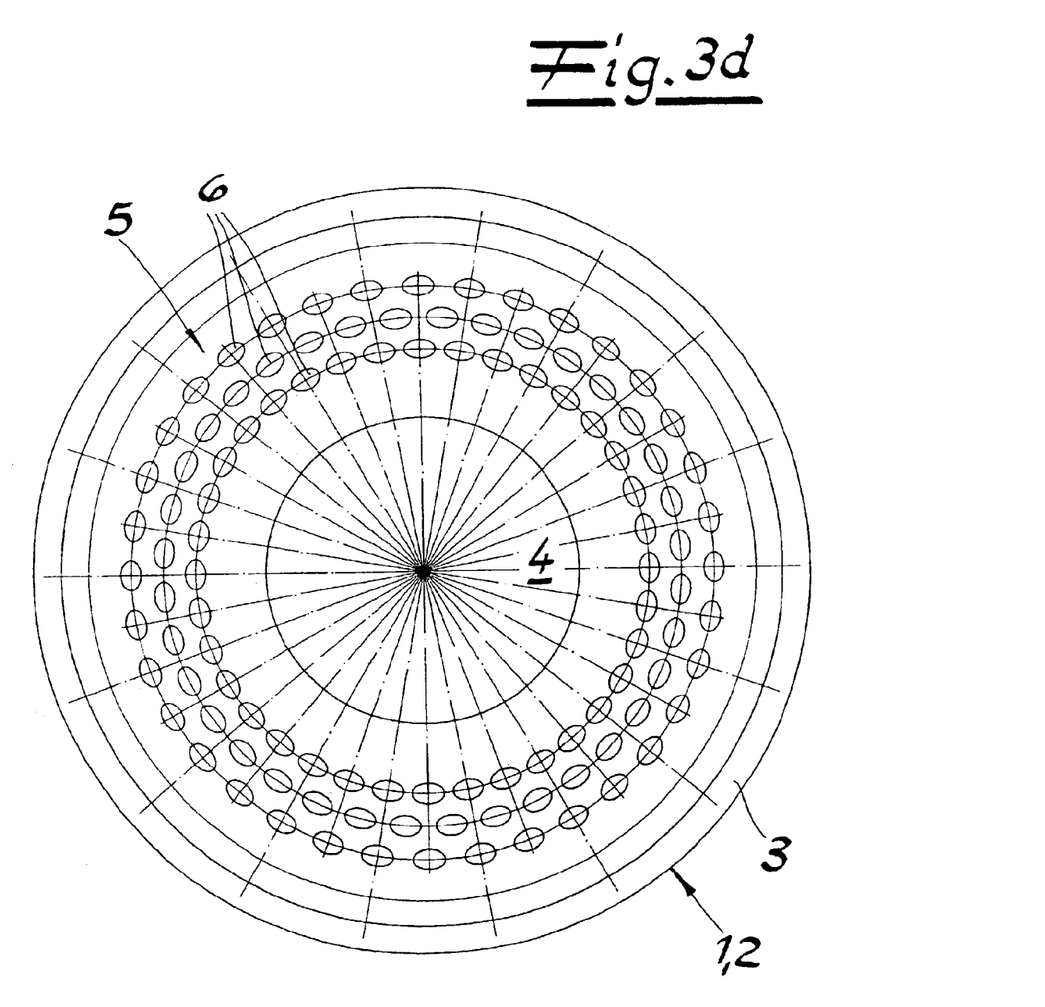
Figure 3E:
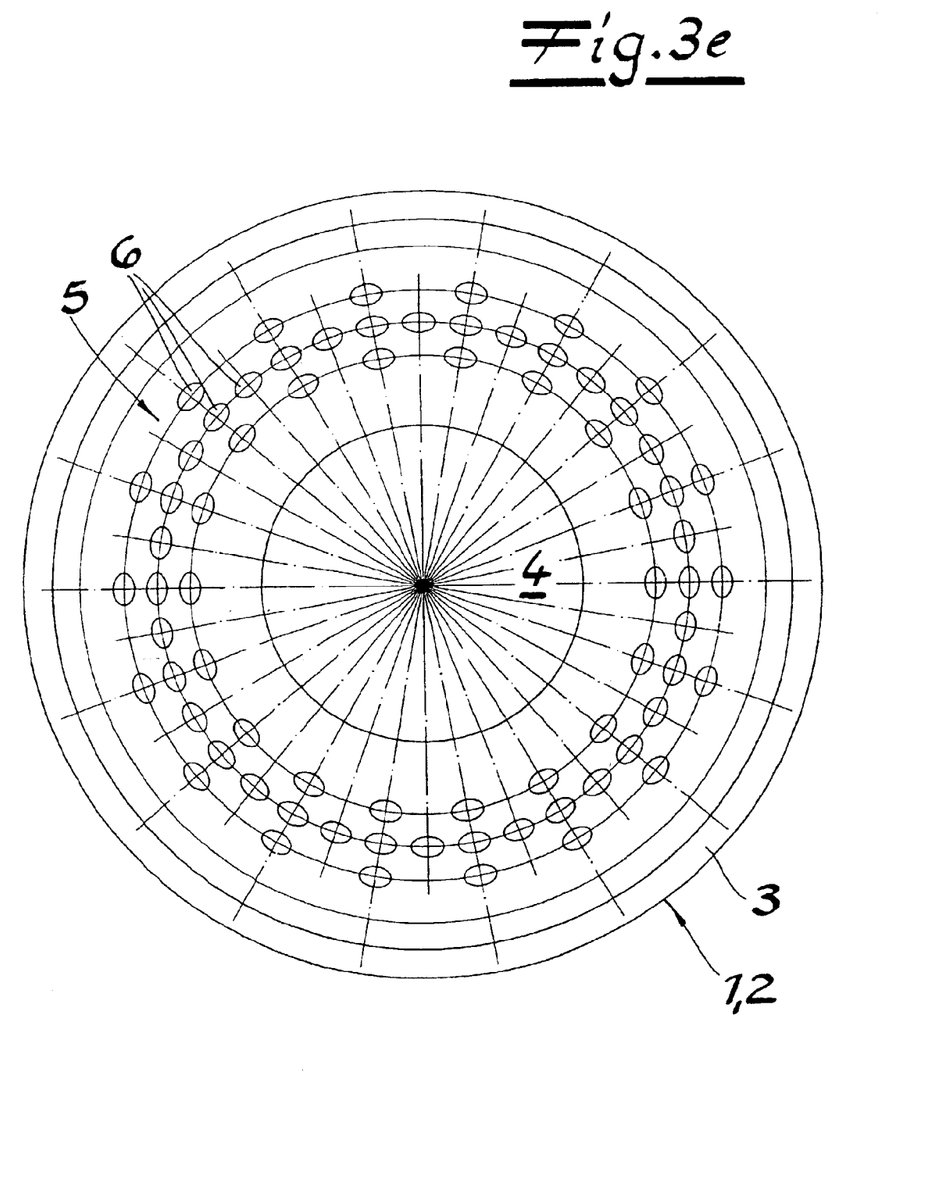
Figure 3F:
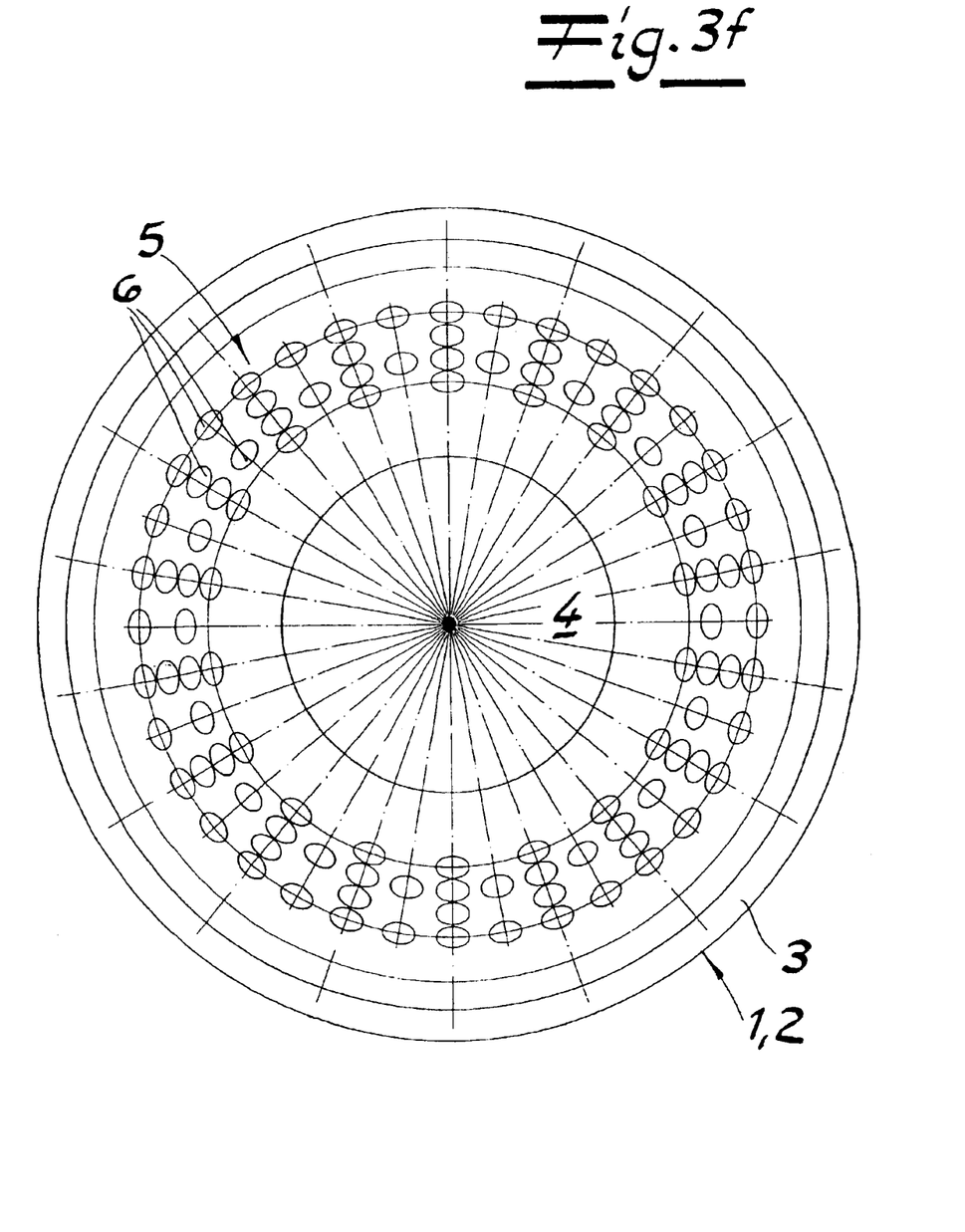
Figure 3G:
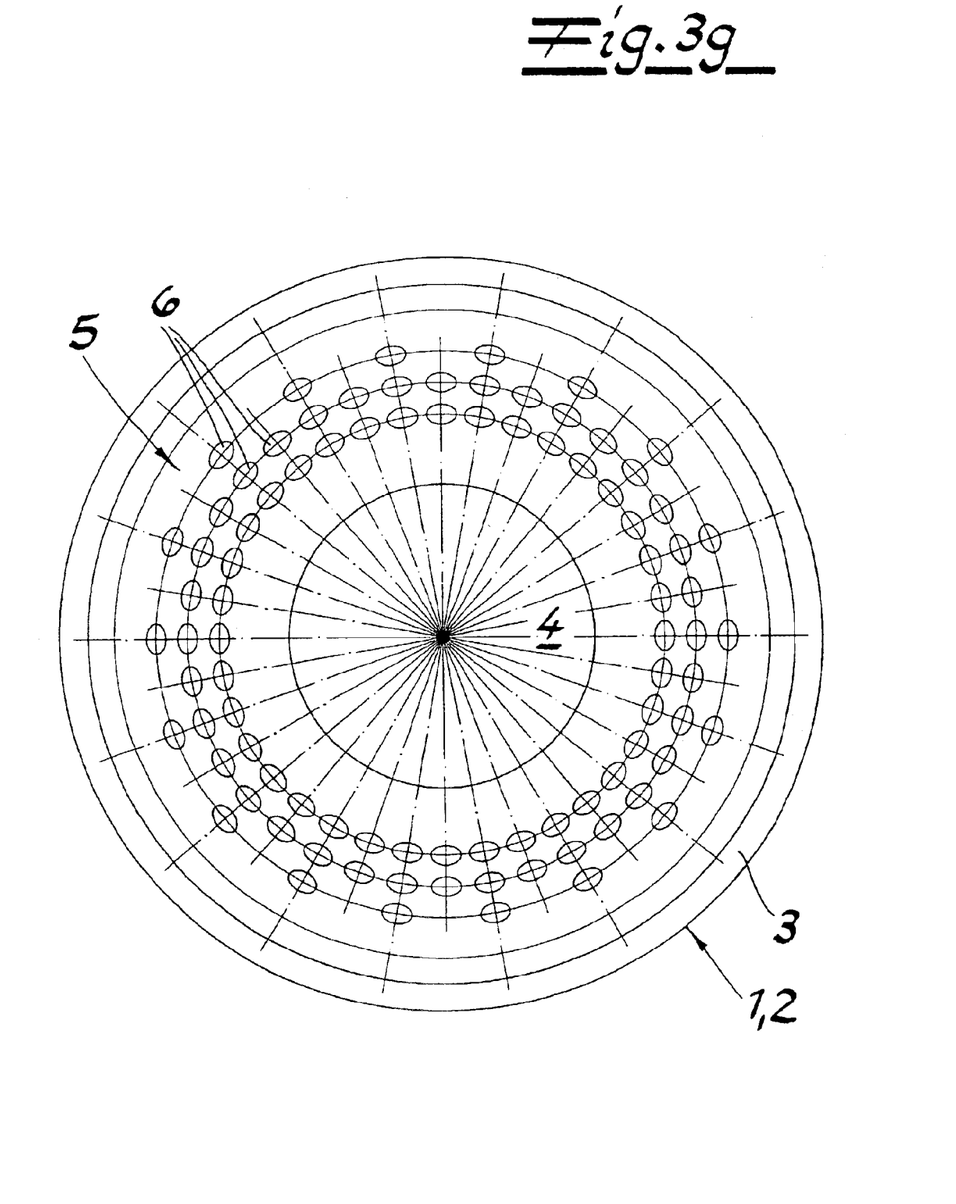
Figure 3H:
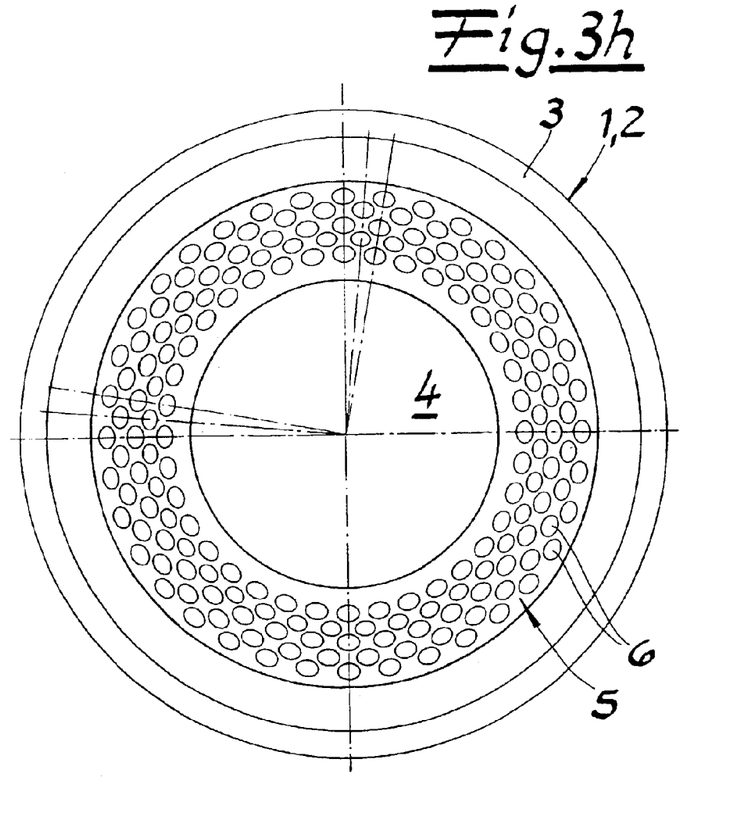

FIG. 2 shows that a bottom side 4 of the elastomer body 1 contains a core 7 that is incorporated in this body by vulcanization and contains a connector device for connecting a piston rod. The connector device can be in the form of a recess in bottom 4. Device 8 can be in the form of a reinforcing insert or simply a gap in bottom 4, wherein this insert or gap is substantially cylindrically shaped and extends into the body of the diaphragm. In the exemplified embodiment, the product side of the bottom has a convex shape. Other shapes, however, are not excluded. Elastomer body 1 contains a textile reinforcing insert 9 disposed in elastomer body 1 for receiving the piston rod and, on its elastomer backside, comprises a recess 10 extending all around in the form of a ring in the transition area between edge 3 of the dish and the flexible section 5 of the diaphragm, as well as ring-shaped grooves 11 located in the transition area between the flexible section 5 of the diaphragm and bottom 4. Recess 10 and grooves 11 form flexible points that additionally enhance the roll-off property of flexible section 5 of the diaphragm.

The instruction as defined by the invention also covers composite diaphragms with a bottom not containing any metal core incorporated therein by vulcanization, but a center opening for the connection with the piston rod.

Figure 4:
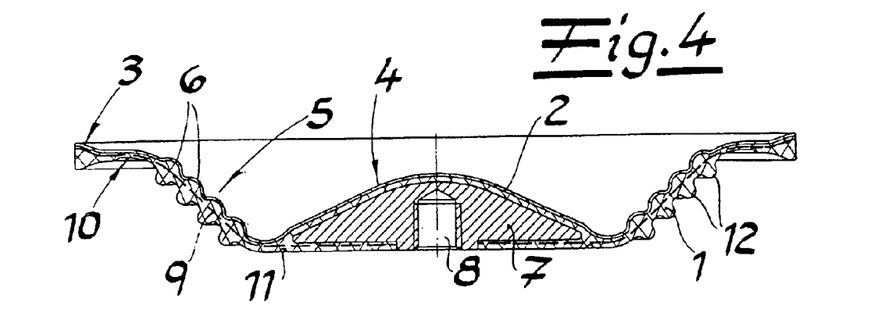
FIG. 4 is a further embodiment of the composite diaphragm shown by a sectional view.

In another embodiment as shown in FIG. 4, elastomer body 1 has ribs 12 located on its elastomer backside in the area of the flexible section 5 of the diaphragm. These ribs extend all around and provide dimensional stability and consist of elastomer material and are shaped on elastomer body 1 by molding.

Accordingly, while at least one embodiment of the present invention has been shown and described, it is to be understood that many changes and modifications may be made thereunto without departing from the spirit and scope of the invention as defined in the appended claims.

What is claimed is:

1. A composite diaphragm for diaphragm pumps comprising:
   a) an elastomer body shaped as a circular disk, the body comprising:
      i) a dish edge having a clamping area;
      ii) a bottom section;
      iii) a flexible diaphragm section connecting said dish edge with said bottom section;
      iv) a plurality of naps disposed on said elastomer body, said naps being configured as convex spherical segments which reinforce the diaphragm section at certain points, wherein in a radial direction, the naps are arranged on lines that run through a center point of the circular disk, lined up on said lines and spaced apart; and
   b) a polytetraflouroethylene (PFTE) coating disposed on a product side of the body, said coating being in a form of a plane ring surface in an area of said flexible diaphragm section, wherein said naps are coated by said coating and form elevations in said coating.

2. The composite diaphragm as in claim 1, wherein said naps are lined up in at least two concentric circles.

3. The composite diaphragm as in claim 2, wherein said plurality of naps are arranged in concentric circles with an angular division of between 5° and 30°.

4. The composite diaphragm as in claim 3, wherein said plurality of naps are lined up in a radial manner in offset angles in relation to each other so that at least one nap of said plurality of naps is disposed adjacent to a gap between two naps lined up in an adjacent peripheral concentric circle.

5. The composite diaphragm as in claim 1, wherein said plurality of said naps are arranged to form a plurality of concentric circles comprising an inner concentric circle having a smallest diameter and additional concentric circles having larger diameters wherein said naps in said inner concentric circle are aligned to form a chain without gaps.

6. The composite diaphragm as in claim 1, wherein said plurality of said naps are arranged to form a plurality of concentric circles comprising an outer concentric circle having a largest diameter and additional concentric circles having smaller diameters wherein said naps in said outer concentric circle are aimed to form a chain without gaps.

7. The composite diaphragm as in claim 1, wherein said bottom section of said elastomer body comprises:
   a) a core formed by vulcanization; and
   b) a connector device disposed in said core for connecting a piston rod.

8. The composite diaphragm as in claim 1, wherein said bottom section contains a center opening for connecting a piston rod.

9. The composite diaphragm as in claim 1, wherein said elastomer body contains a textile reinforcing insert.

10. The composite diaphragm as in claim 1, wherein said elastomer body has an elastomer backside and further comprises a plurality of ring shaped grooves on said elastomer backside in a transition area between said dish edge and said flexible section.

11. The composite diaphragm as in claim 1, wherein said elastomer body has an elastomer backside and further comprises a plurality of ring shaped grooves on said elastomer backside in a transition area between flexible section and said bottom section.

12. The composite diaphragm as in claim 1, wherein said elastomer body has an elastomer backside and further comprises a plurality of recesses on said elastomer backside in a transition area between said dish edge and said flexible section.

13. The composite diaphragm as in claim 1, wherein said elastomer body has an elastomer backside and further comprises a plurality of recesses on said elastomer backside in a transition area between flexible section and said bottom section.

14. The composite diaphragm as in claim 1, further comprising at least one stabilizing rib disposed on an elastomer backside extending around an area of said flexible section, said at least one stabilizing rib consisting of elastomer material and being shaped on the elastomer body by molding.

* * * * *